US012790218B2

(12) United States Patent
Jiang et al.

(10) Patent No.: US 12,790,218 B2
(45) Date of Patent: Nov. 10, 2026

(54) GRAPHITE-SILICON COMPOSITE ANODE ELECTRODE MATERIAL, A PREPARATION METHOD THEREFOR AND AN APPLICATION THEREOF

(71) Applicant: JIANGSU ZENERGY BATTERY TECHNOLOGIES GROUP CO., LTD., Jiangsu (CN)

(72) Inventors: Kecheng Jiang, Jiangsu (CN); Dinghong Han, Jiangsu (CN)

(73) Assignee: JIANGSU ZENERGY BATTERY TECHNOLOGIES GROUP CO., LTD., Suzhou (CN)

( * ) Notice: Subject to any disclaimer, the term of this patent is extended or adjusted under 35 U.S.C. 154(b) by 429 days.

(21) Appl. No.: 18/388,175

(22) Filed: Nov. 8, 2023

(65) Prior Publication Data

US 2024/0158238 A1 May 16, 2024

(30) Foreign Application Priority Data

Nov. 10, 2022 (CN) ......................... 202211405049.6

(51) Int. Cl.

*H01M 10/0525* (2010.01)
*C01B 32/21* (2017.01)

(Continued)

(52) U.S. Cl.

CPC ......... *C01B 32/21* (2017.08); *H01M 10/0525* (2013.01); *C01P 2004/03* (2013.01);

(Continued)

(58) Field of Classification Search

CPC . C01B 32/21; H01M 10/0525; H01M 4/0471; H01M 4/133; H01M 4/134;

(Continued)

(56) References Cited

U.S. PATENT DOCUMENTS

2023/0075032 A1* 3/2023 Che ...................... H01M 4/364

FOREIGN PATENT DOCUMENTS

CN 107528063 * 12/2017
CN 107528063 A 12/2017

(Continued)

*Primary Examiner* — Lisa S Park

(74) *Attorney, Agent, or Firm* — The Sun IP Law

(57) ABSTRACT

The disclosure relates to a graphite-silicon composite anode electrode material, a preparation method therefor, and the application thereof. The preparation method for the graphite-silicon composite anode electrode material comprises: mixing a starch and a lithium salt to obtain a mixed solution S, heating, and stirring; adding a biological enzyme, stirring to obtain a mixed solution T, mixing the mixed solution T with nano silicon, shaking to obtain an adsorption type mixed solution, and drying to obtain porous starch; carrying out primary thermal carbonization to obtain a black powder, adding an organic acid ammonium into the black powder, carrying out thermal adsorption, and dehydrating to obtain a nitrogen-adsorbed porous silicon-Li-containing precursor; and mixing the nitrogen-adsorbed porous silicon-Li-containing precursor with graphite spheres, introducing a mixed gas to obtain a porous silicon-Li-containing precursor and graphite sphere mixture surrounded by the mixed gas, and then carrying out secondary thermal carbonization to obtain the graphite-silicon composite anode electrode material. The graphite-silicon composite anode electrode material is applied to the preparation of a lithium ion battery and has relatively good cycle performance.

20 Claims, 2 Drawing Sheets

(51) Int. Cl.
*H01M 4/04* (2006.01)
*H01M 4/134* (2010.01)

(52) U.S. Cl.
CPC ....... *C01P 2004/61* (2013.01); *C01P 2006/11* (2013.01); *C01P 2006/12* (2013.01); *C01P 2006/40* (2013.01)

(58) Field of Classification Search
CPC ......... H01M 4/1393; H01M 2004/027; H01M 4/1395; H01M 4/36; H01M 4/386; H01M 4/587; H01M 4/625; H01M 4/628; C01P 2004/03; C01P 2004/61; C01P 2006/11; C01P 2006/12; C01P 2006/40; Y02E 60/10
See application file for complete search history.

(56) References Cited

FOREIGN PATENT DOCUMENTS

| | | | |
|---|---|---|---|
| CN | 108390051 | * | 8/2018 |
| CN | 109449388 | A | 3/2019 |
| CN | 111153394 | * | 5/2020 |
| CN | 111153394 | A | 5/2020 |
| CN | 111785951 | A | 10/2020 |
| CN | 112110436 | A | 12/2020 |

* cited by examiner

GRAPHITE-SILICON COMPOSITE ANODE ELECTRODE MATERIAL, A PREPARATION METHOD THEREFOR AND AN APPLICATION THEREOF

TECHNICAL FIELD

The present disclosure relates to the technical field of lithium batteries, and particularly relates to a graphite-silicon composite anode electrode material, a preparation method therefor and an application thereof.

BACKGROUND

In recent years, lithium-ion batteries have become the main energy storage devices for powering most consumer and portable electronic devices. With the rise and application of new energy vehicles, lithium-ion batteries are gradually blooming in the electric vehicle market.

However, the theoretical capacity of commercial graphite anode electrodes is only 372 m·Ah/g. Hence, driven by the contradiction between the demand for large capacity and the capacity of the existing commercial graphite anode electrode, it has become urgent to develop an anode electrode material of battery with a higher energy density and better cycle performance. At room temperature, a silicon material has a theoretical capacity of 4200 m·Ah/g, compared with a graphite material, it can store 10 times more charge, and thus has great disclosure prospects.

However, there is a large volume change in a silicon anode electrode material in a lithium-ion battery during the delithiation/intercalation process, which will make properties of the Si anode electrode material unsatisfactory in terms of cycle and rate performance, will make it difficult to be directly used as the anode electrode material, and thus hinders the commercialization of the silicon anode electrode material. An anode electrode material obtained by doping silicon in a graphite anode electrode material can alleviate the problem caused by the volume expansion of the silicon material. Moreover, a carbon layer and porosity can more effectively suppress its volume change, maintain the stability of the silicon anode electrode material, and improve electrical properties of the material. Therefore, how to select a carbon layer coated on a silicon anode electrode material and design the porosity of the silicon anode electrode material is the key to improving the silicon anode electrode material.

SUMMARY

In order to solve the technical problem above, the present disclosure provides a graphite-silicon composite anode electrode material, a preparation method therefor and an application thereof. In the present disclosure, lithium can be absorbed through surface porous treatment of starch, and through further pore expansion, nano silicon and ammonium acetate can be absorbed, and high-temperature carbonization is carried out to obtain a porous silicon-Li-containing precursor doped with adsorbed silicon, lithium, and nitrogen. The porous silicon-Li-containing precursor has a carbon matrix structure with a certain porosity. The carbon matrix structure provides a buffer space for the expansion of silicon, effectively inhibits volume expansion, and can avoid increased expansion due to repeated expansion, shrinkage, cracking and falling off of silicon during the cycle, ensuring that the material has good cycle performance during the application process. Moreover, a carbon coating layer is formed by surrounding a mixed gas and carrying out secondary carbonization to ensure that the conductivity of the silicon surface can be improved, and at the same time, it can avoid direct contact between silicon and the electrolyte to ensure the formation of a stable SEI film during the cycle.

The technical solutions of the present disclosure are specifically as follows:

The first object of the present disclosure is to provide a preparation method for a graphite-silicon composite anode electrode material, comprising the following steps:

(1) mixing a starch and a lithium salt to obtain a mixed solution S, heating and stirring, adjusting the pH value of the mixed solution S to 3.0-6.5, adding a biological enzyme, and stirring to obtain a mixed solution T;

(2) mixing and shaking the mixed solution T obtained in the step (1) with nano silicon to obtain an adsorption-type mixed solution, carrying out solid-liquid separation to obtain a solid phase, and drying the obtained solid phase to obtain porous starch;

(3) carrying out primary thermal carbonization on the porous starch obtained in the step (2) to obtain a black powder, adding an organic acid ammonium solution to the black powder, heating for thermal adsorption, and dehydrating to obtain a nitrogen-adsorbed porous silicon-Li-containing precursor;

(4) mixing the nitrogen-adsorbed porous silicon-Li-containing precursor obtained in the step (3) and graphite spheres, introducing a mixed gas to obtain a porous silicon-Li-containing precursor and graphite sphere mixture surrounded by the mixed gas, then carrying out secondary thermal carbonization, cooling down to a certain temperature, maintaining this temperature for stabilization and demagnetization, and drying to obtain the graphite-silicon composite anode electrode material.

In one embodiment of the present disclosure, in the step (1), the lithium salt is one or more selected from lithium acetate, lithium bromide, lithium chloride, lithium phosphate and lithium perchlorate.

In one embodiment of the present disclosure, in the step (1), the pH regulator for adjusting the mixed solution S is one or more selected from acetic acid, formic acid, propionic acid, aliphatic carboxylic acids, sulfamic acid, glycolic acid, citric acid, tartaric acid, malic acid, succinic acid and ethylenediaminetetraacetic acid.

In one embodiment of the present disclosure, in the step (1), the biological enzyme is one or more selected from α-amylase, β-amylase, glucose oxidase, saccharification enzyme and pullulanase.

In one embodiment of the present disclosure, in the step (1), the biological enzyme is 0.3-6% of the mass of the mixed solution S.

In one embodiment of the present disclosure, in the step (1), the heating temperature is 30° C.-50° C.

In one embodiment of the present disclosure, in the step (1), the mass ratio of the starch to the lithium salt is 100:0.01-15.

In one embodiment of the present disclosure, in the step (2), the mass ratio of the mixed solution T to nano silicon is 10-200: 1-50.

In one embodiment of the present disclosure, in the step (2), the particle size of the nano silicon is 0.05 μm-1.2 μm.

In one embodiment of the present disclosure, in the step (2), pressure filtration is used for solid-liquid separation, and drying of the solid phase is also included.

In one embodiment of the present disclosure, in the step (3), the organic acid ammonium in the organic acid ammonium solution is one or more selected from ammonium oxalate, ammonium propionate and ammonium acetate; wherein the organic acid ammonium solution is used as both a carbon source and a nitrogen source.

In one embodiment of the present disclosure, the ammonium acetate solution is obtained by mixing 0.1 wt %-1.2 wt % of acetic acid and 0.1 wt %-3 wt % of ammonia.

In one embodiment of the present disclosure, in the step (3), the carbonization conditions for the primary thermal carbonization are as follows: the heating temperature is 440° C.-950° C., and the heating time is 4 h-56 h. Wherein, high-temperature thermal carbonization can stably solidify silicon and lithium; and a continuous heat treatment furnace is used for heating.

In one embodiment of the present disclosure, in the step (3), the solid-liquid ratio of the black powder to the organic acid ammonium solution is 1-2: 2-6 kg/L.

In one embodiment of the present disclosure, in the step (3), the heating temperature of the thermal adsorption is 65° C.-98° C.

In one embodiment of the present disclosure, in the step (3), the dehydration temperature is 80° C.-120° C.

In one embodiment of the present disclosure, in the step (3), cooling, grinding and sieving are further comprised after the first thermal carbonization.

In one embodiment of the present disclosure, in the step (4), the temperature after cooling to a certain temperature is 400° C.-700° C.

In one embodiment of the present disclosure, in the step (4), the mixed gas is obtained by mixing a C1-C6 hydrocarbon and argon.

In one embodiment of the present disclosure, the C1-C6 hydrocarbon is one or more selected from methane, ethane, acetylene, butyne, pentane and heptane.

Further, when the C1-C6 hydrocarbon is pentane or heptane, the mixture of the C1-C6 hydrocarbon and argon needs to be heated at a heating temperature of 30° C.-150° C. to finally obtain a mixed gas.

In one embodiment of the present disclosure, the volume ratio of the C1-C6 hydrocarbon to argon is 1-3: 1-5.

In one embodiment of the present disclosure, in the step (4), the mass ratio of the nitrogen-adsorbed porous silicon-Li-containing precursor to graphite spheres is 3-16:10-20.

In one embodiment of the present disclosure, in the step (4), the conditions for the second thermal carbonization are as follows: the heating temperature is 800° C.-960° C., and the heating time is 4 h-36 h; and a continuous heat treatment furnace is used for heating.

In one embodiment of the present disclosure, in the step (4), the graphite spheres are obtained from a carbon material through high-temperature graphitization; wherein the carbon material is one or more selected from graphite sphere needle coke, pitch coke and mesophase carbon microspheres.

In one embodiment of the present disclosure, in the step (4), after cooling to stabilize it, grinding and sieving are also included.

In one embodiment of the present disclosure, in the step (4), the graphite-silicon composite anode electrode material has a particle size of 3 μm-35 μm, a specific surface area SSA of 0.65 $m^2/g$-6.4 $m^2/g$, and a tap density of 0.85 $g/cm^3$-1.36 $g/cm^3$.

In one embodiment of the present disclosure, in the step (4), the silicon content in the graphite-silicon composite anode electrode material is 3 wt %-78 wt %.

The second object of the present disclosure is to provide a graphite-silicon composite anode electrode material obtained by the preparation method.

The third object of the present disclosure is to provide a silicon-graphite anode electrode plate comprising the graphite-silicon composite anode electrode material, a conductive material, and a binding substance.

In one embodiment of the present disclosure, the mass ratio of the graphite-silicon composite anode electrode material, conductive material, and binding substance is 77-99: 0.2-8:0.2-12.0.

Further, the mass proportion of the graphite-silicon composite anode electrode material is 77-78%, 78-81%, 81-82%, 82-83%, 83-84%, 84-85%, 85-86%, 86-87%, 87-88%, 88-89%, 89-90%, 90-91%, 91-92%, 92-93%, 93-94%, 94-95%, 95-96%, 96-97%, 97-98%, or 98-99%.

The fourth object of the present disclosure is to provide a method for preparing a silicon-graphite anode electrode plate, comprising the following steps: mixing a graphite-silicon composite anode electrode material, a conductive material, and a binding substance to obtain a preliminary silicon-graphite mixed dry material; adding water until the solid content is less than 85%, and stirring and mixing uniformly to obtain a silicon-graphite slurry; adding an appropriate amount of water, full stirring was carried out at a self-spinning speed of 1200 rpm-2500 rpm for 45 min to 180 min, adding water to adjust the viscosity of the silicon-graphite slurry to 2000 mPa·s-8000 mPa·s and the solid content to 40-65%, and stirring at 100 rpm-800 rpm at a low self-spinning speed for 45 min-180 min for defoaming to obtain a uniformly mixed silicon-graphite slurry; and coating the uniformly mixed silicon-graphite slurry on at least one side of the front and back surface of an anode electrode current collector to obtain a silicon-graphite coating, and drying and tabletting, so as to obtain the silicon-graphite anode electrode plate.

In one embodiment of the present disclosure, after the preliminary silicon-graphite mixed dry material is obtained, pre-stirring is carried out at a self-spinning speed of 400 rpm-1200 rpm for 10 min-60 min.

In one embodiment of the present disclosure, after the solid content is less than 85%, the stirring conditions include self-spinning speed of 1000 rpm-2500 rpm and full stirring for 45 min-120 min.

In one embodiment of the present disclosure, the thickness of the silicon-graphite coating is 18 μm-480 μm, and the surface density of the silicon-graphite slurry on the silicon-graphite anode electrode plate is 0.0028 $g/cm^2$-0.063 $g/cm^2$.

Further, the thickness of the silicon-graphite coating is 40 μm-360 μm; preferably 50 μm-300 μm, such as 50 μm, 55 μm, 60 μm, 65 μm, 70 μm, 75 μm, 80 μm, 85 μm, 90 μm, 95 μm, 100 μm, 105 μm, 110 μm, 120 μm, 125 μm, 130 μm, 135 μm, 140 μm, 145 μm, 150 μm, 155 μm, 160 μm, 180 μm, 200 μm, 210 μm, 220 μm, 230 μm, 240 μm, 250 μm, 260 μm, 270 μm, 280 μm, 290 μm, or 300 μm.

Further, the areal density of the silicon-graphite slurry on the silicon-graphite anode electrode plate is 0.005 $g/cm^2$-0.055 $g/cm^2$, more preferably 0.008 $g/cm^2$-0.050 $g/cm^2$, for example 0.008 $g/cm^2$, 0.010 $g/cm^2$, 0.012 $g/cm^2$, 0.013 $g/cm^2$, 0.014 $g/cm^2$, 0.015 $g/cm^2$, 0.017 $g/cm^2$, 0.018 $g/cm^2$, 0.020 $g/cm^2$, 0.025 $g/cm^2$, 0.030 $g/cm^2$, 0.035 $g/cm^2$, 0.040 $g/cm^2$, 0.045 $g/cm^2$, or 0.050 $g/cm^2$.

In one embodiment of the present disclosure, the binding substance is one or more of polyvinylidene fluoride, polyvinyl alcohol, carboxymethyl cellulose, lithium carboxymethyl cellulose, sodium carboxymethyl cellulose, methacrylamide, polyacrylic acid, lithium polyacrylate, polyacrylamide, polyamide, polyimide, acrylate, styrene-butadiene rubber, sodium alginate, chitosan, ethylene glycol, and guar gum.

In one embodiment of the present disclosure, the conductive material is one or more of conductive carbon black, acetylene black, graphite, graphene, carbon micro-nano wire conductive material and carbon micro-nano tubular conductive material.

In one embodiment of the present disclosure, the anode electrode current collector is one or more of copper foil, galvanized nickel copper foil, and carbon-coated copper foil, and is preferably copper foil, galvanized copper foil, nickel-plated copper foil, or carbon-coated copper foil.

The fifth object of the present disclosure is to provide a lithium-ion battery, comprising the silicon-graphite anode electrode plate, a separator, a positive electrode plate, and an electrolyte. The lithium-ion battery is prepared by the following method: winding a silicon-graphite anode electrode plate, a separator, and a positive sheet to obtain a cell, packing the cell in a housing, drying, injecting an electrolyte, packaging, forming, and capacity grading to obtain the lithium-ion battery.

The above technical solution of the present disclosure has the following advantages compared with the prior art.

In the present disclosure, the preliminary formed porous structure can absorb lithium through the surface porous treatment of starch, saccharification enzyme is further added to carry out secondary pore expansion treatment of starch, so that it is convenient to adsorb nano silicon and nitrogen, and a porous silicon-Li-containing precursor is formed after high-temperature carbonization; wherein, the silicon-Li-containing precursor has a carbon matrix structure with certain pores; the synergistic effect of the carbon matrix structure, lithium-nitrogen doping and the carbon coating layer which is formed by the mixed gas provides a buffer space for the expansion of silicon, which can avoid repeated expansion, shrinkage, cracking and falling off of silicon during the cycle, ensuring that the material has good cycle performance during the disclosure application process.

BRIEF DESCRIPTION OF THE DRAWINGS

In order to make the content of the present disclosure understood more easily and clearly, the present disclosure will be described in further detail below according to specific embodiments of the present disclosure in conjunction with the accompanying drawings, the invention will be further illustrated in detail, wherein.

DETAILED DESCRIPTION OF THE EMBODIMENTS

The present disclosure will be further described below in conjunction with specific embodiments, so that those skilled in the art can better understand the present disclosure and implement it, but the given embodiments are not intended to limit the present disclosure.

Embodiment 1

This embodiment provided a graphite-silicon composite anode electrode material and a preparation method therefor, and a silicon-graphite anode electrode plate and an application thereof, which were specifically as follows:

1. Preparation Method for a Graphite-Silicon Composite Anode Electrode Material:

(1) Starch and lithium phosphate (at a mass ratio of 100:2) were mixed to obtain a mixed solution S, the mixed solution was sent to a reactor at 40° C. for heating and stirring, and an appropriate amount of acetic acid was dropwise added to make the pH of the mixed solution S around 3.8, then the solution was stirred to carry out the surface porous treatment of starch. Saccharification enzyme was added to the mixed solution S, and stirring was carried out to obtain a mixed solution T, wherein, the amount of saccharification enzyme was 0.5% of the mass of the mixed solution S.

Figure 1:
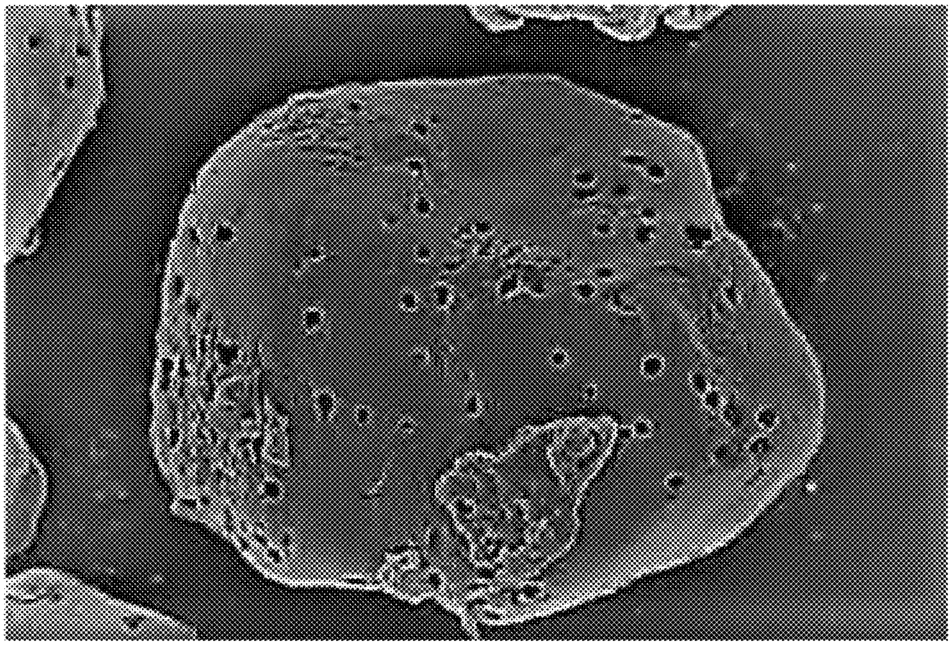
FIG. 1 is the SEM image of porosification starch obtained in Embodiment 1 of the present disclosure.

(2) The mixed solution T and nano silicon with a particle size of 0.12 μm-0.9 μm were mixed into a container tank according to a mass ratio of 100:10, the container tank was sent to a shaker and was shaken to adsorb nano silicon to obtain an adsorption-type mixed solution, then press filtration and drying were carried out to obtain porosification starch, the characterization diagram of porosification starch was shown in FIG. 1.

(3) The porous starch was sent to a continuous heat treatment furnace for the first thermal carbonization (the temperature in the continuous heat treatment furnace was 600° C., and the time was 12 h), cooling, grinding, and sieving, so as to obtain a black powder (high temperature carbonization could stabilize silicon and lithium). The black powder and an ammonium acetate solution (obtained by mixing 0.13% by mass of acetic acid and 0.35% by mass of ammonia) were mixed according to a solid-liquid kg/L ratio of 10:50. The mixture was sent to a reaction kettle, heated at 90° C. for thermal adsorption, and then dehydrated at 110° C. to obtain a nitrogen-adsorbed porous silicon-Li-containing precursor.

(4) The nitrogen-adsorbed porous silicon-Li-containing precursor and graphite spheres were mixed and sent to a tube furnace (at a mass ratio of 15:85). Methane and Ar gas were mixed according to the volume ratio of 1:2 to obtain a mixed gas, the mixed gas was sent to the tube furnace to obtain a porous silicon-Li-containing precursor and graphite sphere mixture wrapped by the mixed gas. Then second thermal carbonization was carried out (the temperature in the tube furnace was 900° C., and the time was 10 h). The temperature was reduced to 600° C. for stabilization for 5 h. Grinding, sieving, demagnetization and drying were carried out to obtain a graphite-silicon composite anode electrode material with a particle size between 3 μm and 26 μm, wherein, the specific surface area SSA was 1.6 $m^2/g$, and the tap density was 1.14 $g/cm^3$.

2. Silicon-Graphite Anode Electrode Plate:

(1) Silicon-graphite anode electrode plate: the graphite-silicon composite anode electrode material, a conductive material (the conductive material was obtained by mixing conductive carbon black and a carbon nanotube conductive material at a mass ratio of 9:1), and a binding substance (the binding substance was obtained by mixing sodium carboxymethyl cellulose and styrene-butadiene rubber at a mass ratio of 2:1) were mixed at a mass ratio of 95:2:3 to obtain a preliminary silicon-graphite mixed dry material. The preliminary silicon-graphite mixed dry material was sent to a stirring tank and was pre-stirred at a self-spinning speed of 500 rpm for 30 minutes. Then deionized water was added and stirred to control the solid content of the slurry to <85%. Then full stirring was carried out at a self-spinning speed of 1800 rpm for 100 minutes for uniform mixing to obtain a silicon-graphite slurry.

(2) An appropriate amount of deionized water was added, full stirring was carried out at a self-spinning speed of 2500 rpm for 60 minutes for uniform mixing to obtain a silicon-graphite slurry. Water was added to adjust the viscosity of the silicon-graphite slurry to 3100 mPa·s and the solid content to 52%, stirring was carried out at a low self-spinning speed of 100 rpm for 90 min for defoaming so as to obtain a stirred silicon-graphite slurry. The silicon-graphite slurry obtained above was coated on at least one side of the front and back sides of an anode electrode current collector to obtain a silicon-graphite coating, drying and tabletting were carried out to obtain a silicon-graphite anode electrode plate with a thickness of 126 μm.

Figure 2:
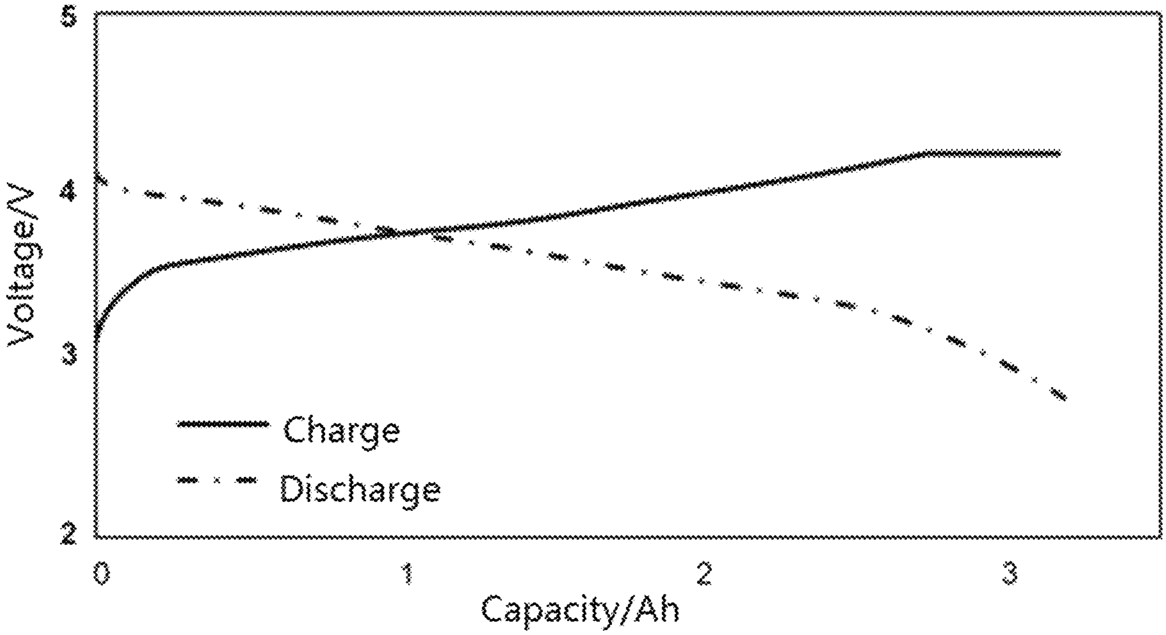
FIG. 2 is the charge-discharge curve diagram of the lithium-ion battery obtained in Embodiment 1 of the present disclosure.

3. Application:

A lithium-ion battery was obtained by winding the silicon-graphite anode electrode plate, a separator, and a positive electrode plate to obtain a cell, packing the cell in a housing, drying, injecting an electrolyte, packaging, forming, and capacity grading. The charge-discharge curve of the obtained lithium-ion battery was shown in FIG. 2.

Embodiment 2

This embodiment provided a graphite-silicon composite anode electrode material and a preparation method therefor, and a silicon-graphite anode electrode plate and the application thereof, which were specifically as follows:

1. Preparation Method for a Graphite-Silicon Composite Anode Electrode Material:

(1) Starch and lithium phosphate (at a mass ratio of 100:2) were mixed to obtain a mixed solution S, the mixed solution was sent to a reactor at 40° C. for heating and stirring, an appropriate amount of acetic acid was dropwise added to make the pH of the mixed solution S around 3.8, then the solution was stirred to carry out the surface porous treatment of starch. Saccharification enzyme was added to the mixed solution S, and stirring was carried out to obtain a mixed solution T, wherein, the amount of saccharification enzyme was 0.5% of the mass of the mixed solution S.

(2) The mixed solution T and nano silicon with a particle size of 0.12 μm-0.9 μm were mixed into a container tank according to a mass ratio of 100:15, the container tank was sent to a shaker and was shaken to adsorb nano silicon to obtain an adsorption-type mixed solution, then press filtration and drying were carried out to obtain porosification starch.

(3) The porosification starch was sent to a continuous heat treatment furnace for the first thermal carbonization (the temperature in the continuous heat treatment furnace was 600° C., and the time was 12 h), cooling, grinding, and sieving, so as to obtain a black powder (high temperature carbonization could stabilize silicon and lithium). The black powder and an ammonium acetate solution (obtained by mixing 0.13% by mass of acetic acid and 0.35% by mass of ammonia) were mixed according to a solid-liquid kg/L ratio of 10:50, the mixture was sent to a reaction kettle, heated at 90° C. for thermal adsorption, and then dehydrated at 110° C. to obtain a nitrogen-adsorbed porous silicon-Li-containing precursor.

(4) The nitrogen-adsorbed porous silicon-Li-containing precursor and graphite spheres were mixed and sent to a tube furnace (at a mass ratio of 20:80), methane and Ar gas were mixed according to the volume ratio of 1:2 to obtain a mixed gas, the mixed gas was sent to the tube furnace to obtain a porous silicon-Li-containing precursor and graphite sphere mixture surrounded by the mixed gas, then second thermal carbonization was carried out (the temperature in the tube furnace was 900° C., and the time was 10 h), the temperature was reduced to 600° C. for stabilization for 5 h. Grinding, sieving, demagnetization and drying were carried out to obtain a graphite-silicon composite anode electrode material with a particle size between 3 μm and 26 μm, wherein, the specific surface area SSA was 1.7 $m^2/g$, and the tap density was 1.17 $g/cm^3$.

2. Silicon-Graphite Anode Electrode Plate:

(1) Silicon-graphite anode electrode plate: the graphite-silicon composite anode electrode material, a conductive material (the conductive material was obtained by mixing conductive carbon black and a carbon nanotube conductive material at a mass ratio of 9:1), and a binding substance (the binding substance was obtained by mixing sodium carboxymethyl cellulose and styrene-butadiene rubber at a mass ratio of 2:1) were mixed at a mass ratio of 95:2:3 to obtain a preliminary silicon-graphite mixed dry material. The preliminary silicon-graphite mixed dry material was sent to a stirring tank and was pre-stirred at a self-spinning speed of 500 rpm for 30 minutes, then deionized water was added and stirred to control the solid content of the slurry to <85%, then full stirring was carried out at a self-spinning speed of 1800 rpm for 100 minutes for uniform mixing to obtain a silicon-graphite slurry.

(2) An appropriate amount of deionized water was added, full stirring was carried out at a self-spinning speed of 2500 rpm for 60 minutes for uniform mixing to obtain a silicon-graphite slurry, water was added to adjust the viscosity of the silicon-graphite slurry to 3100 mPa·s and the solid content to 52%, stirring was carried out at a low self-spinning speed of 100 rpm for 90 min for defoaming so as to obtain a stirred silicon-graphite slurry, the silicon-graphite slurry obtained above was coated on at least one side of the front and back sides of an anode electrode current collector to obtain a silicon-graphite coating, drying and tabletting were carried out to obtain a silicon-graphite anode electrode plate with a thickness of 126 μm.

Figure 3:
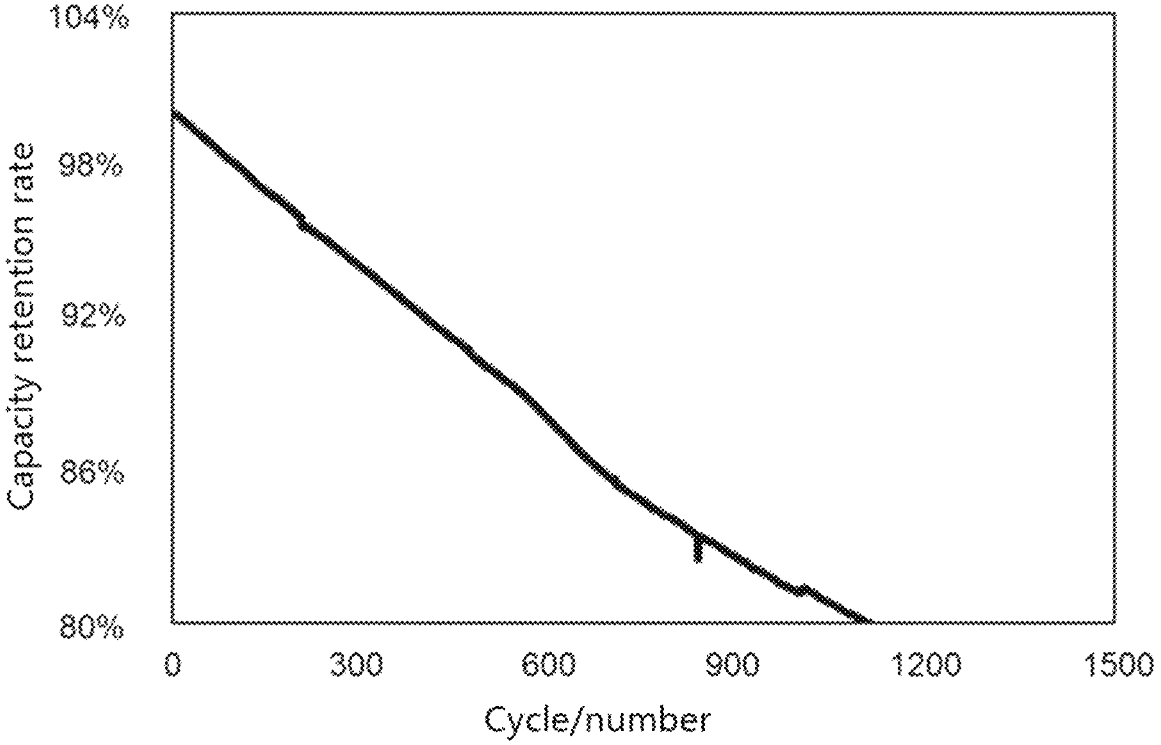
FIG. 3 is a cycle performance graph of the lithium ion battery obtained in Embodiment 2 of the present disclosure.

3. Application:

A lithium-ion battery was obtained by winding the silicon-graphite anode electrode plate, a separator, and a positive electrode plate to obtain a cell, packing the cell in a housing, drying, injecting an electrolyte, packaging, forming, and capacity grading. The cycle performance of the obtained lithium-ion battery was shown in FIG. 3.

Embodiment 3

This embodiment provided a graphite-silicon composite anode electrode material and a preparation method therefor, and a silicon-graphite anode electrode plate and the application thereof, which were specifically as follows.

1. Preparation Method for a Graphite-Silicon Composite Anode Electrode Material:

(1) Starch and lithium phosphate (at a mass ratio of 100:2) were mixed to obtain a mixed solution S, the mixed solution was sent to a reactor at 40° C. for heating and stirring, an appropriate amount of acetic acid was dropwise added to make the pH of the mixed solution S around 3.8, then the solution was stirred to carry out the surface porous treatment of starch. Saccharification enzyme was added to the mixed solution S, and stirring was carried out to obtain a mixed solution T, wherein, the amount of saccharification enzyme was 0.5% of the mass of the mixed solution S.

(2) The mixed solution T and nano silicon with a particle size of 0.12 μm-0.9 μm were mixed into a container tank according to a mass ratio of 100:30, the container tank was sent to a shaker and was shaken to adsorb nano silicon to obtain an adsorption-type mixed solution, then press filtration and drying were carried out to obtain porous starch.

(3) The porous starch was sent to a continuous heat treatment furnace for the first thermal carbonization (the temperature in the continuous heat treatment furnace was 600° C., and the time was 12 h), cooling, grinding, and sieving, so as to obtain a black powder (high temperature carbonization can stabilize silicon and lithium), the black powder and an ammonium acetate solution (obtained by mixing 0.13% by mass of acetic acid and 0.35% by mass of ammonia) were mixed according to a solid-liquid kg/L ratio of 10:50, the mixture was sent to a reaction kettle, heated at 90° C. for thermal adsorption, and then dehydrated at 110° C. to obtain a nitrogen-adsorbed porous silicon-Li-containing precursor.

(4) The nitrogen-adsorbed porous silicon-Li-containing precursor and graphite spheres were mixed and sent to a tube furnace (at a mass ratio of 30:70), a mixed gas (wherein, the volume ratio of methane and Ar was 1:2) of methane and Ar was introduced into the tube furnace to obtain a porous silicon-Li-containing precursor and graphite sphere mixture surrounded by the mixed gas, then second thermal carbonization was carried out (the temperature in the tube furnace was 900° C., and the time was 10 h), the temperature was reduced to 600° C. for stabilization for 5 h. Grinding, sieving, demagnetization and drying were carried out to obtain a graphite-silicon composite anode electrode material with a particle size between 3 μm and 27 μm, wherein, the specific surface area SSA was 1.8 $m^2/g$, and the tap density was 1.09 $g/cm^3$.

2. Silicon-Graphite Anode Electrode Plate:

(1) Silicon-graphite anode electrode plate: the graphite-silicon composite anode electrode material, a conductive material (the conductive material was obtained by mixing conductive carbon black and a carbon nanotube conductive material at a mass ratio of 9:1), and a binding substance (the binding substance was obtained by mixing sodium carboxymethyl cellulose and styrene-butadiene rubber at a mass ratio of 2:1) were mixed at a mass ratio of 95:2:3 to obtain a preliminary silicon-graphite mixed dry material, the preliminary silicon-graphite mixed dry material was sent to a stirring tank and was pre-stirred at a self-spinning speed of 500 rpm for 30 minutes. Then deionized water was added and stirred to control the solid content of the slurry to <85%, then full stirring was carried out at a self-spinning speed of 1800 rpm for 100 minutes for uniform mixing to obtain a silicon-graphite slurry.

(2) An appropriate amount of deionized water was added, full stirring was carried out at a self-spinning speed of 2500 rpm for 60 minutes for uniform mixing to obtain a silicon-graphite slurry, water was added to adjust the viscosity of the silicon-graphite slurry to 3100 mPa·s and the solid content to 52%, stirring was carried out at a low self-spinning speed of 100 rpm for 90 min for defoaming so as to obtain a stirred silicon-graphite slurry, the silicon-graphite slurry obtained above was coated on at least one side of the front and back sides of an anode electrode current collector to obtain a silicon-graphite coating, drying and tabletting were carried out to obtain a silicon-graphite anode electrode plate with a thickness of 126 μm.

3. Application:

A lithium-ion battery was obtained by winding the silicon-graphite anode electrode plate, a separator, and a positive electrode plate to obtain a cell, packing the cell in a housing, drying, injecting an electrolyte, packaging, forming, and capacity grading.

Embodiment 4

This embodiment provided a graphite-silicon composite anode electrode material and a preparation method therefor, and a silicon-graphite anode electrode plate and the application thereof, which were specifically as follows.

1. Preparation Method for a Graphite-Silicon Composite Anode Electrode Material:

(1) Starch and lithium phosphate (at a mass ratio of 100:8) were mixed to obtain a mixed solution S, the mixed solution was sent to a reactor at 40° C. for heating and stirring, an appropriate amount of acetic acid was dropwise added to make the pH of the mixed solution S around 4.3, then the solution was stirred to carry out the surface porous treatment of starch. Saccharification enzyme was added to the mixed solution S, and stirring was carried out to obtain a mixed solution T, the amount of saccharification enzyme was 0.5% of the mass of the mixed solution S.

(2) The mixed solution T and nano silicon with a particle size of 0.12 μm-0.9 μm were mixed into a container tank according to a mass ratio of 100:10, the container tank was sent to a shaker and was shaken to adsorb nano silicon to obtain an adsorption-type mixed solution, then press filtration and drying were carried out to obtain porous starch.

(3) The porous starch was sent to a continuous heat treatment furnace for the first thermal carbonization (the temperature in the continuous heat treatment furnace was 750° C., and the time was 8 h), cooling, grinding, and sieving were carried out to obtain a black powder (high temperature carbonization could stabilize silicon and lithium), the black powder and an ammonium acetate solution (obtained by mixing 0.15% by mass of acetic acid and 0.41% by mass of ammonia) were mixed according to a solid-liquid kg/L ratio of 10:60, the mixture was sent to a reaction kettle, heated at 90° C. for thermal adsorption, and then dehydrated at 110° C. to obtain a nitrogen-adsorbed porous silicon-Li-containing precursor.

(4) The nitrogen-adsorbed porous silicon-Li-containing precursor and graphite spheres were mixed and sent to a tube furnace (at a mass ratio of 15:85), a mixed gas (wherein, the volume ratio of methane and Ar was 1:3) of methane and Ar was introduced into the tube furnace to obtain a porous silicon-Li-containing precursor and graphite sphere mixture surrounded by the mixed gas, then second thermal carbonization was carried out (the temperature in the tube furnace was 800° C., and the time was 16 h), the temperature was reduced to 550° C. for stabilization for 6 h, grinding, sieving, demagnetization and drying were carried out to obtain a graphite-silicon composite anode electrode material with a particle size between 3.0 μm and 29 μm, wherein, the specific surface area SSA was 1.9 $m^2/g$, and the tap density was 1.21 $g/cm^3$.

2. Silicon-Graphite Anode Electrode Plate:

(1) Silicon-graphite anode electrode plate: the graphite-silicon composite anode electrode material, a conductive material (the conductive material was obtained by mixing conductive carbon black and a carbon nanotube conductive material at a mass ratio of 9:1), and a binding substance (the binding substance was obtained by mixing sodium carboxymethyl cellulose and styrene-butadiene rubber at a mass ratio of 2:1) were mixed at a mass ratio of 95.5:1.5:3 to obtain a preliminary silicon-graphite mixed dry material. The preliminary silicon-graphite mixed dry material was sent to a stirring tank and is pre-stirred at a self-spinning speed of 500 rpm for 30 minutes. Then deionized water was added and stirred to control the solid content of the slurry to <85%, then full stirring was carried out at a self-spinning speed of 200 rpm for 90 minutes for uniform mixing to obtain a silicon-graphite slurry.

(2) An appropriate amount of deionized water was added, full stirring was carried out at a self-spinning speed of 2500 rpm for 60 minutes for uniform mixing to obtain a silicon-graphite slurry, water was added to adjust the viscosity of the silicon-graphite slurry to 3900 mPa·s and the solid content to 55%, stirring was carried out at a low self-spinning speed of 100 rpm for 90 min for defoaming so as to obtain a stirred silicon-graphite slurry, the silicon-graphite slurry obtained above was coated on at least one side of the front and back sides of an anode electrode current collector to obtain a silicon-graphite coating, drying and tabletting were carried out to obtain a silicon-graphite anode electrode plate with a thickness of 114 μm.

3. Application:

A lithium-ion battery was obtained by winding the silicon-graphite anode electrode plate, a separator, and a positive electrode plate to obtain a cell, packing the cell in a housing, drying, injecting an electrolyte, packaging, forming, and capacity grading.

Embodiment 5

This embodiment provided a graphite-silicon composite anode electrode material and a preparation method therefor, and a silicon-graphite anode electrode plate and the application thereof, which were specifically as follows.

1. Preparation Method for a Graphite-Silicon Composite Anode Electrode Material:

(1) Starch and lithium phosphate (at a mass ratio of 100:8) were mixed to obtain a mixed solution S, the mixed solution was sent to a reactor at 40° C. for heating and stirring, an appropriate amount of acetic acid was dropwise added to make the pH of the mixed solution S around 3.7, then the solution was stirred to carry out the surface porous treatment of starch. Saccharification enzyme was added to the mixed solution S, and stirring was carried out to obtain a mixed solution T, wherein, the amount of saccharification enzyme was 1.5% of the mass of the mixed solution S.

(2) The mixed solution T and nano silicon with a particle size of 0.12 μm-0.9 μm were mixed into a container tank according to a mass ratio of 100:15, the container tank was sent to a shaker and was shaken to adsorb nano silicon to obtain an adsorption-type mixed solution, then press filtration and drying were carried out to obtain porous starch.

(3) The porous starch was sent to a continuous heat treatment furnace for the first thermal carbonization (the temperature in the continuous heat treatment furnace was 750° C., and the time was 8 h), cooling, grinding, and sieving, so as to obtain a black powder (high temperature carbonization could stabilize silicon and lithium), the black powder and an ammonium acetate solution (obtained by mixing 0.15% by mass of acetic acid and 0.41% by mass of ammonia) were mixed according to a solid-liquid kg/L ratio of 10:60, the mixture was sent to a reaction kettle, heated at 90° C. for thermal adsorption, and then dehydrated at 110° C. to obtain a nitrogen-adsorbed porous silicon-Li-containing precursor.

(4) The nitrogen-adsorbed porous silicon-Li-containing precursor and graphite spheres were mixed and sent to a tube furnace (at a mass ratio of 20:80), a mixed gas (the volume ratio of propane and Ar was 1:3) of propane and Ar was introduced into the tube furnace to obtain a porous silicon-Li-containing precursor and graphite sphere mixture surrounded by the mixed gas, then second thermal carbonization was carried out (the temperature in the tube furnace was 800° C., and the time was 16 h), the temperature was reduced to 550° C. for stabilization for 6 h, grinding, sieving, demagnetization and drying were carried out to obtain a graphite-silicon composite anode electrode material with a particle size between 3.0 μm and 29 μm, wherein, the specific surface area SSA was 1.8 $m^2/g$, and the tap density was 1.24 $g/cm^3$.

2. Silicon-Graphite Anode Electrode Plate:

(1) Silicon-graphite anode electrode plate: the graphite-silicon composite anode electrode material, a conductive material (the conductive material was obtained by mixing conductive carbon black and a carbon nanotube conductive material at a mass ratio of 9:1), and a binding substance (the binding substance was obtained by mixing sodium carboxymethyl cellulose and styrene-butadiene rubber at a mass ratio of 2:1) were mixed at a mass ratio of 95.5:1.5:3 to obtain a preliminary silicon-graphite mixed dry material. The preliminary silicon-graphite mixed dry material was sent to a stirring tank and was pre-stirred at a self-spinning speed of 500 rpm for 30 minutes, then deionized water was added and stirred to control the solid content of the slurry to <85%, then full stirring was carried out at a self-spinning speed of 200 rpm for 90 minutes for uniform mixing to obtain a silicon-graphite slurry.

(2) An appropriate amount of deionized water was added, full stirring was carried out at a self-spinning speed of 2500 rpm for 60 minutes for uniform mixing to obtain a silicon-graphite slurry, water was added to adjust the viscosity of the silicon-graphite slurry to 3900 mPa·s and the solid content to 55%, stirring was carried out at a low self-spinning speed of 100 rpm for 90 min for defoaming so as to obtain a stirred silicon-graphite slurry. The silicon-graphite slurry obtained above was coated on at least one side of the front and back sides of an anode electrode current collector to obtain a silicon-graphite coating, drying and tabletting were carried out to obtain a silicon-graphite anode electrode plate with a thickness of 114 μm.

3. Application:

A lithium-ion battery was obtained by winding the silicon-graphite anode electrode plate, a separator, and a positive electrode plate to obtain a cell, packing the cell in a housing, drying, injecting an electrolyte, packaging, forming, and capacity grading.

Embodiment 6

This embodiment provided a graphite-silicon composite anode electrode material and a preparation method therefor, and a silicon-graphite anode electrode plate and the application thereof, which were specifically as follows.

1. Preparation Method for a Graphite-Silicon Composite Anode Electrode Material:

(1) Starch and lithium phosphate (at a mass ratio of 100:8) were mixed to obtain a mixed solution S, the mixed solution was sent to a reactor at 40° C. for heating and stirring, an appropriate amount of acetic acid was dropwise added to make the pH of the mixed solution S around 3.8, then the solution was stirred to carry out the surface porous treatment of starch. Saccharification enzyme was added to the mixed solution S, and stirring was carried out to obtain a mixed solution T, wherein, the amount of saccharification enzyme was 1.5% of the mass of the mixed solution S.

(2) The mixed solution T and nano silicon with a particle size of 0.12 μm-0.9 μm were mixed into a container tank according to a mass ratio of 100:30, the container tank was sent to a shaker and was shaken to adsorb nano silicon to obtain an adsorption-type mixed solution, then press filtration and drying were carried out to obtain porous starch.

(3) The porous starch was sent to a continuous heat treatment furnace for the first thermal carbonization (the temperature in the continuous heat treatment furnace was 750° C., and the time was 8 h), cooling, grinding, and sieving, so as to obtain a black powder (high temperature carbonization could stabilize silicon and lithium), the black powder and an ammonium acetate solution (obtained by mixing 0.15% by mass of acetic acid and 0.41% by mass of ammonia) were mixed according to a solid-liquid kg/L ratio of 10:60. The mixture was sent to a reaction kettle, heated at 90° C. for thermal adsorption, and then dehydrated at 110° C. to obtain a nitrogen-adsorbed porous silicon-Li-containing precursor.

(4) The nitrogen-adsorbed porous silicon-Li-containing precursor and graphite spheres were mixed and sent to a tube furnace (at a mass ratio of 30:70), a mixed gas (wherein, the volume ratio of ethane and Ar was 1:3) of ethane and Ar was introduced into the tube furnace to obtain a porous silicon-Li-containing precursor and graphite sphere mixture surrounded by the mixed gas, then second thermal carbonization was carried out (the temperature in the tube furnace was 800° C., and the time was 16 h). The temperature was reduced to 550° C. for stabilization for 6 h. Grinding, sieving, demagnetization and drying were carried out to obtain a graphite-silicon composite anode electrode material with a particle size between 3.0 μm and 29 μm, wherein, the specific surface area SSA was 1.5 $m^2/g$, and the tap density was 1.08 $g/cm^3$.

2. Silicon-Graphite Anode Electrode Plate:

(1) Silicon-graphite anode electrode plate: the graphite-silicon composite anode electrode material, a conductive material (the conductive material was obtained by mixing conductive carbon black and a carbon nanotube conductive material at a mass ratio of 9:1), and a binding substance (the binding substance was obtained by mixing sodium carboxymethyl cellulose and styrene-butadiene rubber at a mass ratio of 2:1) were mixed at a mass ratio of 95.5:1.5:3 to obtain a preliminary silicon-graphite mixed dry material. The preliminary silicon-graphite mixed dry material was sent to a stirring tank and was pre-stirred at a self-spinning speed of 500 rpm for 30 minutes, then deionized water was added and stirred to control the solid content of the slurry to <85%, then full stirring was carried out at a self-spinning speed of 200 rpm for 90 minutes for uniform mixing to obtain a silicon-graphite slurry.

(2) An appropriate amount of deionized water was added, full stirring was carried out at a self-spinning speed of 2500 rpm for 60 minutes for uniform mixing to obtain a silicon-graphite slurry, water was added to adjust the viscosity of the silicon-graphite slurry to 3900 mPa·s and the solid content to 55%, stirring was carried out at a low self-spinning speed of 100 rpm for 90 min for defoaming so as to obtain a stirred silicon-graphite slurry. The silicon-graphite slurry obtained above was coated on at least one side of the front and back sides of an anode electrode current collector to obtain a silicon-graphite coating, drying and tabletting were carried out to obtain a silicon-graphite anode electrode plate with a thickness of 114 μm.

3. Application:

A lithium-ion battery was obtained by winding the silicon-graphite anode electrode plate, a separator, and a positive electrode plate to obtain a cell, packing the cell in a housing, drying, injecting an electrolyte, packaging, forming, and capacity grading.

Comparative Embodiment 1

The difference from the Embodiment 4 was that the surface porous treatment and saccharification enzyme treatment were lacking in the step (1).

Comparative Embodiment 2

The difference from the Embodiment 4 was that in the step (4), there was no carbon coating layer obtained by second thermal carbonization after surrounding the mixed gas.

Comparative Embodiment 3

The difference from the Embodiment 4 was that in the step (3), the black powder was not added and mixed to the ammonium acetate solution to absorb nitrogen.

Embodiment and Comparative Embodiment Test

1. Powder Resistance, Battery Silicon-Graphite Anode Electrode Expansion Under Full Charge:

A powder resistance instrument was used to measure the resistance of the graphite-silicon composite anode electrode material of each embodiment and comparative embodiment; The thickness of the silicon-graphite anode electrode plate after pressing, the thickness of the battery electrode plate under full charge were measured, the expansion rate of the silicon-graphite anode electrode plate was equal to (the thickness of the battery electrode plate under full charge−the thickness of the silicon-graphite anode electrode plate after tabletting)/the thickness of the silicon-graphite anode electrode plate after tabletting×100%. The experimental results were shown in Table 1.

2. Battery Electrical Performance Test:

At room temperature of 25° C., with an initial voltage of 2.8 V and a cut-off voltage of 4.25 V, the lithium-ion batteries of the embodiments and comparative embodiments were charged to 4.25 V at 1 C, charged at a constant voltage of 4.25 V until the current decreased to 0.05 C, discharged at 0.5 C to 2.8 V, then charged to 4.25 V at 1 C, charged at a constant voltage of 4.25 V until the current decreased to 0.05 C, and discharged to 2.8 V at 0.5 C. The batteries were charged and discharged in this way, and the capacity retention rate of each cycle was recorded. The experimental results are shown in Table 2.

TABLE 1

| Powder resistance, expansion of the silicon-graphite anode electrode plate | | |
|---|---|---|
| | Powder resistance (Ω) | Expansion rate |
| Embodiment 1 | 0.171 | 41.4% |
| Embodiment 2 | 0.169 | 40.9% |
| Embodiment 3 | 0.162 | 36.4% |
| Embodiment 4 | 0.154 | 36.1% |
| Embodiment 5 | 0.155 | 37.3% |
| Embodiment 6 | 0.132 | 38.6% |
| Comparative Embodiment 1 | 0.191 | 51.1% |
| Comparative Embodiment 2 | 0.281 | 49.4% |
| Comparative Embodiment 3 | 0.154 | 42.1% |

TABLE 2

The first coulombic efficiency and capacity retention rate of the battery

| | capacity retention rate at 25° C. | | |
|---|---|---|---|
| | Cycle 100 | Cycle 400 | Cycle 900 |
| Embodiment 1 | 96.5% | 94.6% | 83.0% |
| Embodiment 2 | 95.6% | 93.2% | 82.1% |
| Embodiment 3 | 95.2% | 94.7% | 82.8% |
| Embodiment 4 | 96.7% | 94.9% | 83.2% |
| Embodiment 5 | 97.4% | 96.6% | 84.9% |
| Embodiment 6 | 97.6% | 95.8% | 84.1% |
| Comparative Embodiment 1 | 95.5% | 92.0% | 75.3% |
| Comparative Embodiment 2 | 94.5% | 88.7% | 79.5% |
| Comparative Embodiment 3 | 96.5% | 84.9% | 81.3% |

From the data in Table 1, it could be determined that the powder resistance of Comparative Embodiments 1, 2, and 3 increased slightly, indicating that the porous carbon formed by carbonization after surface acid treatment and biological enzyme (saccharification enzyme, etc.) treatment of starch, and the carbon coating layer formed by adding the mixed gas can improve the conductivity of silicon anode electrode materials; in addition, the expansion of Comparative Embodiments 1 and 2 was significantly larger, indicating that the porous carbon matrix structure obtained by carbonization of the porous starch obtained by surface acid treatment and biological enzyme (saccharification enzyme, etc.) treatment could share the expansion of the internal silicon in pores and the carbon coating formed by adding the mixed gas and carrying out second thermal carbonization could effectively slow down the expansion of the silicon anode electrode material during the cycle.

It could be determined from the data in Table 2 that due to the excessive expansion of silicon in Comparative Embodiments 1 and 2, the capacity retention rate was low and the battery attenuation was serious. When the cycle reaches the 900th cycle, the capacity retention rates of the batteries in Comparative Embodiments 1 and 2 were respectively 75.3%, 79.5%, both lower than 80% capacity retention rate; ammonium acetate adsorption treatment increased the nitrogen content of the graphite-silicon composite anode electrode material, and the increase of nitrogen reduced the Gibbs free energy of the carbon matrix skeleton intercalating lithium ions, which could provide more lithium ion intercalation sites for the carbon material and kept more active lithium ions, so the battery capacity retention rate could be improved and the battery cycle stability could be improved.

Apparently, the above-mentioned embodiments are only embodiments for clear description, and are not intended to limit the embodiments. For those of ordinary skill in the art, on the basis of the above description, other changes or modifications in various forms can also be made. It is not necessary and impossible to exhaustively list all the embodiments here. However, the obvious changes or modifications derived therefrom are still within the scope of protection of the present disclosure.

What is claimed is:

1. A preparation method for a graphite-silicon composite anode electrode material, comprising the following steps:

(1) mixing a starch and a lithium salt to obtain a mixed solution S, heating and stirring, adjusting the pH value of the mixed solution S to 3.0-6.5, adding a biological enzyme, and stirring to obtain a mixed solution T;

(2) mixing the mixed solution T obtained in the step (1) with nano silicon, shaking to obtain an adsorption-type mixed solution, carrying out solid-liquid separation to obtain a solid phase, and drying the obtained solid phase to obtain porous starch;

(3) carrying out primary thermal carbonization on the porous starch obtained in the step (2) to obtain a black powder, adding an organic acid ammonium solution to the black powder, heating for thermal adsorption, and dehydrating to obtain a nitrogen-adsorbed porous silicon-Li-containing precursor;

(4) mixing the nitrogen-adsorbed porous silicon-Li-containing precursor obtained in the step (3) and graphite spheres, introducing a mixed gas to obtain a porous silicon-Li-containing precursor and graphite sphere mixture surrounded by the mixed gas, then carrying out secondary thermal carbonization, cooling down to a certain temperature, maintaining the temperature for stabilization and demagnetization, and drying to obtain the graphite-silicon composite anode electrode material.

2. The preparation method of claim 1, wherein in the step (1), the lithium salt is one or more selected from lithium acetate, lithium bromide, lithium chloride, lithium phosphate and lithium perchlorate.

3. The preparation method of claim 1, wherein in the step (1), the biological enzyme is one or more selected from α-amylase, β-amylase, glucose oxidase, saccharification enzyme and pullulanase.

4. The preparation method of claim 1, wherein in the step (3), the organic acid ammonium solution comprises at least one organic acid ammonium selected from the group consisting of ammonium oxalate, ammonium propionate and ammonium acetate.

5. The preparation method of claim 1, wherein in the step (4), the mixed gas is obtained by mixing C1-C6 hydrocarbons and argon.

6. The preparation method of claim 1, wherein in the step (4), the graphite spheres are obtained from a carbon material through high-temperature graphitization; wherein the carbon material is one or more selected from graphite spherical needle coke, pitch coke and mesophase carbon microspheres.

7. A graphite-silicon composite anode electrode material obtained by the preparation method of claim 1.

8. A silicon-graphite anode electrode plate, comprising the graphite-silicon composite anode electrode material of claim 7, a conductive material, and a binding material;

wherein the mass ratio of the graphite-silicon composite anode electrode material, the conductive material and the binding material is 77-99:0.2-8:0.2-12.0.

9. A preparation method for the silicon-graphite anode electrode plate of claim 8, comprising the following steps: mixing the graphite-silicon composite anode electrode material, the conductive material, and the binding material to obtain a primary silicon-graphite mixed dry material; adding water until the solid content is less than 85%, and stirring and mixing uniformly to obtain a silicon-graphite slurry; adding water to adjust the viscosity of the silicon-graphite slurry to 2000 m·Pas-8000 mPa·s and the solid content to 40-65%, to obtain a uniformly mixed silicon-graphite slurry; coating the uniformly mixed silicon-graphite slurry on at least one side of the front and back surface of a anode electrode current collector to obtain a silicon-graphite coating, and drying and tabletting to obtain the silicon-graphite anode electrode plate.

10. A lithium-ion battery, comprising the silicon-graphite anode electrode plate of claim 8.

11. The preparation method of claim 1, wherein in the step (1), the mass ratio of the starch to the lithium salt is 100:0.01-15.

12. The preparation method of claim 1, wherein in the step (2), the mass ratio of the mixed solution T to nano silicon is 10-200:1-50.

13. The preparation method of claim 1, wherein in the step (2), the particle size of the nano silicon is 0.05 μm-1.2 μm.

14. The preparation method of claim 1, wherein in the step (3), the solid-liquid ratio of the black powder to the organic acid ammonium solution is 1-2:2-6 kg/L.

15. The preparation method of claim 1, wherein in the step (3), cooling, grinding and sieving are further comprised after the first thermal carbonization.

16. The preparation method of claim 1, wherein in the step (4), after cooling to stabilize it, grinding and sieving are also included.

17. The preparation method of claim 1, wherein in the step (4), the graphite-silicon composite anode electrode material has a particle size of 3 μm-35 μm, a specific surface area SSA of 0.65 $m^2/g$-6.4 $m^2/g$, and a tap density of 0.85 $g/cm^3$-1.36 $g/cm^3$.

18. The preparation method of claim 1, wherein in the step (4), the silicon content in the graphite-silicon composite anode electrode material is 3 wt %-78 wt %.

19. A graphite-silicon composite anode electrode material obtained by the preparation method of claim 5.

20. A graphite-silicon composite anode electrode material obtained by the preparation method of claim 6.

* * * * *